United States Patent [19]

Kleiner et al.

[11] 4,262,029

[45] Apr. 14, 1981

[54] APPARATUS AND PROCESS FOR THE PREPARATION OF GASIFIED CONFECTIONARIES BY PRESSURIZED DEPOSIT MOLDING

[75] Inventors: Fredric Kleiner, New City; Pradip K. Roy, Yorktown, both of N.Y.

[73] Assignee: General Foods Corporation, White Plains, N.Y.

[21] Appl. No.: 88,510

[22] Filed: Oct. 26, 1979

[51] Int. Cl.³ ............................................. A23G 3/12
[52] U.S. Cl. .................................. 426/512; 426/660; 426/474; 426/572; 264/138; 264/319; 264/328.2
[58] Field of Search ............... 426/572, 470, 474, 660, 426/512; 264/138, 319, 328

[56] References Cited

U.S. PATENT DOCUMENTS

| | | | |
|---|---|---|---|
| 2,082,313 | 6/1937 | Todd | 426/512 |
| 2,197,919 | 4/1940 | Bowman | 426/474 |
| 2,600,569 | 6/1952 | Oakes | 426/474 |
| 2,666,400 | 1/1954 | Vogt | 426/512 |
| 3,012,893 | 12/1961 | Kremzner | 426/474 |
| 3,582,349 | 6/1971 | Rasmusson | 426/512 |
| 3,985,909 | 10/1976 | Kirkpatrick | 426/474 |
| 3,985,910 | 10/1976 | Kirkpatrick | 426/474 |
| 4,001,457 | 1/1977 | Hegadorn | 426/474 |
| 4,076,846 | 2/1978 | Nakatsuka | 426/512 |

*Primary Examiner*—Jeanette M. Hunter
*Attorney, Agent, or Firm*—Daniel J. Donovan; B. P. Struzzi; T. R. Savoie

[57] ABSTRACT

A deposit molding arrangement and process for producing regularly shaped pieces of gasified candy which effect a pleasant sizzling sensation in the mouth. A confectionary solution, which may be a sugar melt, is subjected to a superatmospheric carbonating pressure in a carbonating vessel to cause absorption therein of carbon dioxide. A deposit molding arrangement for forming the solution into suitably shaped pieces of candy is maintained at a superatmospheric carbonation pressure in a pressurized housing. The deposit molding arrangement includes a conveyor belt having a plurality of mold cavities formed in its surface. The conveyor belt passes beneath dispensing nozzles which deposit a metered amount of confectionary solution in each mold cavity. The solution is then allowed to cool and solidify in the mold, and the conveyor belt empties the resultant carbonated candy pieces therefrom when it travels to an inverted position. A pressure lock system enables the carbonated candy pieces to be periodically removed from the pressurized housing.

17 Claims, 2 Drawing Figures

APPARATUS AND PROCESS FOR THE PREPARATION OF GASIFIED CONFECTIONARIES BY PRESSURIZED DEPOSIT MOLDING

BACKGROUND OF THE INVENTION

1. Field of the Invention

The present invention relates generally to a process and system for molding gasified candy pieces from a gasified confectionary solution. More particularly, the present invention pertains to a process and system for deposit molding a carbonated sugar solution into suitably shaped pieces of carbonated confectionary.

2. Description of the Prior Art

Deposit molding of confectionary products is well known and recognized in the confectionary arts, and several commercially available types of candy are produced in this manner by commercially available equipment such as the belt depositing system produced by Baker-Perkins Co. In these prior art arrangements a suitable confectionary solution or melt is formed, and the solution is then injected through a suitable nozzle into surface mold cavities wherein the solution solidifies in the shape of the mold cavity. In a typical arrangement a plurality of mold cavities is formed in the surface of a conveyor belt, and the belt is moved under a nozzle or nozzles which dispense a metered, predetermined quantity of the confectionary solution into each mold cavity. The conveyor belt travels in a generally horizontal direction for a sufficient length of time to allow hardening of the molded candies, and the belt then travels to an inverted position in which the shaped confectionary products are dislodged by gravity. The conveyor belt then returns to the nozzle(s) for refill, and the repetitive cycle is repeated. An arrangement of this nature is generally located in a sterile open environment such that the entire molding operation is performed at atmospheric pressure.

Kremzner et al. U.S. Pat. No. 3,012,893 relates to hard candy which has carbon dioxide absorbed therein. In accordance with the teachings of the prior art, a candy of this kind is made by a process which comprises melting crystalline sugar to form a sugar solution, subjecting the melted sugar solution to pressurized carbon dioxide at a pressure of from 50–1000 psig for a sufficient time to permit absorption of from 0.5–15 ml of gas per gram of solution, and cooling the solution under pressure to produce a solid amorphous product which is carbonated. Depressurizing the carbonated candy to atmospheric pressure results in its fracturing randomly into granules of assorted sizes. The resultant product is then sieved to remove the smaller fines. The larger sized pieces are packaged for commercial sale, but a suitable commercial usage has not yet been found for the smaller carbonated candy fines.

The larger pieces sold as a commercial product are irregularly and randomly sized, and have the appearance of broken glass or sharp-edged pieces of gravel. Carbon dioxide is entrained within the carbonated candy as solidified bubbles having a diameter ranging from 3–1000 microns with more than 50% of the bubbles having a diameter greater than 60 microns.

When carbonated candy of this kind is placed in the mouth, it produces an entertaining but short-lived popping sensation therein. As the candy pieces are wetted and warmed in the mouth, the candy melts releasing the carbon dioxide bubbles and producing a tingling, popping effect in the mouth.

SUMMARY OF THE INVENTION

A primary object of the present invention is to provide an arrangement and process for producing gasified candy which has associated therewith a pleasant, sizzling sensation in the mouth rather than the popping effect of candy produced in accordance with the prior art.

Another object of the present invention resides in the provision of a process and arrangement for producing a gasified candy product which does not produce the wasteful side products in the form of fines as in the prior art.

A further objective of the present invention is the production of regularly shaped pieces of gasified candy having the gas retained therein in concentrations of 0.25–5.00 cc of gas per gram of candy, with the gas being evenly distributed therethrough as bubbles having an average diameter in the range of 10 to 60 microns, preferably in the range of 20 to 55 microns, and more preferably in the range of 25–30 microns. The smaller bubble diameter and narrower range of distribution in the average bubble diameter produces a prolonged sizzling feeling in the mouth rather than the short-lived popping sensation associated with prior art candies.

Pursuant to the teachings herein, an arrangement and process is disclosed for preparing gasified candy by pressurized deposit molding. A confectionary solution is produced, and is then subjected to a superatmospheric gas pressure in a pressurizing vessel for a sufficient length of time to cause absorption of the gas into the confectionary solution. A plurality of deposit molds for forming the solution into suitably shaped pieces of candy are prepressurized at a superatmospheric gas pressure in a pressurized housing. The confectionary solution is then deposited in the plurality of prepressurized molds. The solution is then allowed to cool and solidify in the molds, producing regularly shaped pieces of gasified confectionary product, which are emptied from the molds as they are inverted.

Furthermore in accordance with the teachings herein, the pressurizing vessel has a mixer therein which assists in absorption of gas into the solution, and also results in a significant decrease in the average diameter size of bubbles. The smaller average bubble size results in a clarified, more translucent confectionary product, as the clarity of the product is related to the size of the bubbles entrained therein.

In accordance with preferred embodiments disclosed herein, a pressurized vessel subjects a sugar based confectionary solution to carbon dioxide pressure in the range from 50–500 psig, preferably in the 350–450 psig pressure range. The sugar based solution is maintained at a temperature therein in the range from 280° to 320° F. necessary to reach the desired moisture content. The pressurizing vessel includes a mixer therein having blades which are rotated between 200 and 1500 rpm, with the preferred range being 700–900 rpm.

Accordingly, a primary object of the present invention is the provision of a carbonated confectionary product having a regular shape which produces a prolonged and pleasant sizzling sensation in the mouth.

BRIEF DESCRIPTION OF THE DRAWINGS

The foregoing and other objects and advantages of the novel apparatus and process for preparing gasified confectionaries pursuant to the teachings of the present invention may be readily understood by one skilled in the art, having reference to the following detailed description of several preferred embodiments thereof, taken in conjunction with the accompanying drawings wherein identical reference numerals are utilized to refer to like elements throughout the several views, and in which.

DETAILED DESCRIPTION OF THE DRAWINGS

Figure 1:
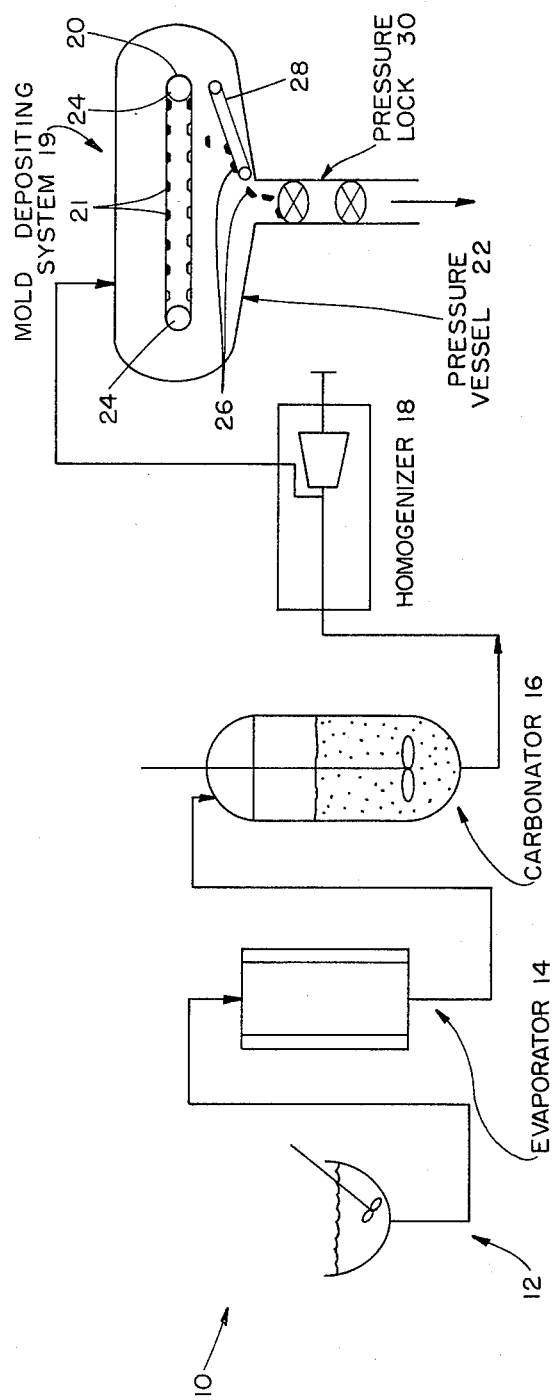
FIG. 1 is a conceptual illustration of the present invention for producing carbonated confectionaries.

Referring to FIG. 1 in detail, a schematic arrangement is illustrated for preparing gasified candy by pressurized deposit molding. A vessel 10 is utilized to prepare a suitable confectionary solution for the production of a candy. The confectionary solution can be prepared from any of the commercially available sugars such as glucose, fructose, sucrose, lactose, etc., either alone or in combination. Alternatively the confectionary solution may have a base formed from ingredients other than sugar. A mixture of 30% lactose and 70% sucrose produces an excellent carbonated confectionary product. A mixture of sucrose with corn syrup (containing glucose, maltose, and dextrin) is also very satisfactory. In one preferred solution, a mixture of sucrose, lactose and corn syrup in ratios of 52:27:21 produces a preferred confectionary product characterized by excellent gas retention and reduced stickiness on standing. The moisture content of the prepared confectionary solution is typically between 1 and 4 percent of the solution, and is preferably between 2 and 3%.

The confectionary solution may also have added coloring, flavorants and/or other active ingredients to enhance the aesthetic appeal of the resulting confectionary product, and to provide a pleasant taste to compliment the sizzling sensation of the gasified candy. These ingredients are normally added after the desired moisture content of the solution has been achieved. Commercially available colorings are produced in a variety of shades, any of which may be utilized herein. The choice of coloring may be dependent upon the desired aesthetic effect and also possibly upon the flavorant. Flavorants such as wintergreen, spearmint, peppermint, birch, anise and fruit flavors such as cherry, lemon-lime, orange, grape, etc., or mixtures thereof, are commercially available, and may be suitably used within the teachings of the present invention. Active ingredients are also commercially available for incorporation in the confectionary product to provide, for example, a breath freshener product. The amount of coloring, flavorants and/or active ingredients used with the teachings herein will vary depending upon considerations well known to those skilled in the confectionary arts.

The deposit molding arrangement 10 includes a vessel 10 for preparing a confectionary solution having a melt temperature between 280° and 320° F. The confectionary product is then introduced into an evaporator 14 wherein excessive water in the solution is evaporated to adjust the moisture content thereof. The confectionary solution should have a moisture content between 1 and 4 percent, preferably between 2 and 3 percent.

The prepared confectionary solution is then introduced into a pressurizing vessel 16 which subjects the solution to a superatmospheric gas pressure for a sufficient length of time to cause the absorption therein of a suitable amount of gas. The pressurizing gas may be carbon dioxide, nitrogen, air, or other suitable gases, although carbon dioxide is a preferred gas. Carbon dioxide is introduced into the pressurizing vessel in the range from 50–500 psig, preferably in the 350–450 psig range. The reactor also includes mixer blades which may be driven in a range from 200–1500 rpm, preferably in the 500–900 rpm range. The confectionary solution is maintained in the pressurizing vessel for a suitable length of time to cause absorption of a given amount of gas into the melt solution. For instance, usually less than ten minutes, normally two to six minutes, is sufficient to complete carbonation of a sugar confectionary solution. Vessel 16 may be a Parr bomb, a small commercially available pressurized vessel equiped with rotary mixing blades. The amount of gas absorbed in the solution may range from 0.25–5 cc of gas per gram of confectionary product.

The gasified confectionary solution is then transferred to a homogenizer 18 such as Manton-Gaulin two stage homogenizer which mechanically shears the gas bubbles further to reduce the average bubble size.

The carbonated confectionary solution is then transferred to a pressurized mold depositing system 19 which typically includes a conveyor belt 20 having a plurality of suitably shaped mold cavities 21 formed in its surface. The conveyor belt is operated within a pressurized vessel 22 which may have an internal pressure which is substantially the same as in the pressurizing vessel 16. The conveyor belt is an endless type of belt which is wrapped around end conveyor rollers 20. The molds in the conveyor belt are transported in a generally horizontal direction beneath a nozzle or nozzles which dispense a metered predetermined quantity of the confectionary solution into each mold cavity. The travel speed of the belt is selected such that by the time the filled mold reaches the end of its horizontal travel, the solution in the cavity has solidified. The belt may be cooled by a suitable gas or liquid cooling system to expedite solidification of the candy. The belt then travels to an inverted position in which the confectionary products are emptied from the molds onto a second conveyor or chute 28 which directs the products to a suitable collection area. A pressure lock 30 is provided to periodically enable collection of the resultant confectionary products.

The travel speed of the belt is selected in accordance with the rate at which the confectionary solution cools and solidifies. The confectionary solution in a particular mold cavity must be solidified by the time that cavity reaches the end of its horizontal travel with the conveyor belt. The rate of solidification may also be controlled by the use of a cooling system for the conveyor belt. The cooling system may be in the form of a closed system in which a suitable coolant is circulated in heat exchange conduits immediately adjacent to the moving conveyor belt. Alternatively the gas which pressurizes the vessel 22 may be cooled and circulated against the confectionary solution in the moving mold cavities.

The temperature of the mold both during and after the injection step is also an important factor in the practice of the present invention. At mold temperatures below approximately 70° F. a carbonated sugar-based solution becomes quite viscous. Accordingly, the temperature of the mold should be above a temperature of 70° F., and preferably should be in the 80° F. to 90° F. range at the time of introduction of the confectionary solution therein. Temperatures above 90° F. are to be avoided in the mold since carbonated candy pieces discharged above that temperature often balloon during storage.

Figure 2:
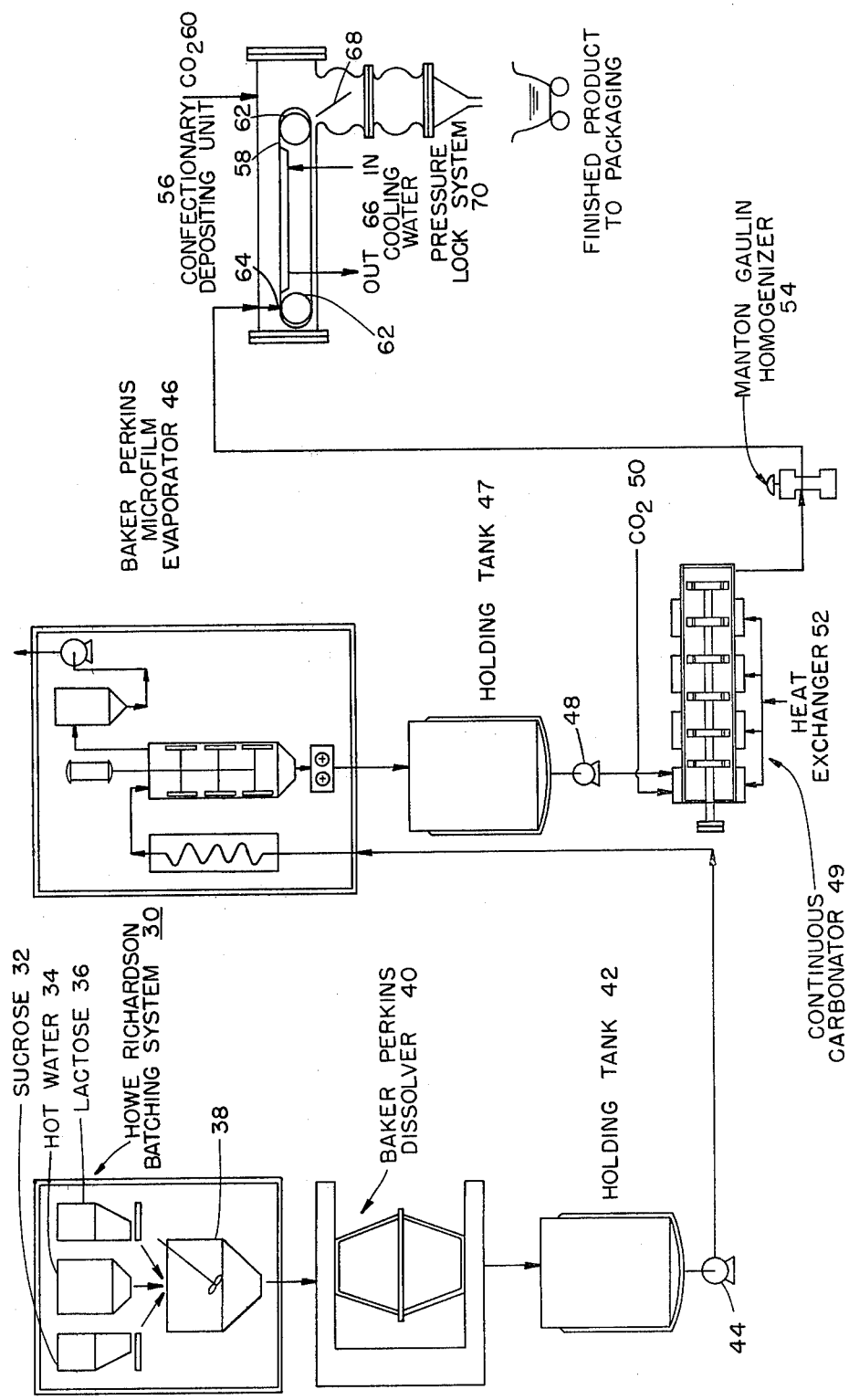
FIG. 2 provides a more detailed illustration of one embodiment of a system for preparing carbonated candy by pressurized deposit molding.

FIG. 2 illustrates details of one possible commercial embodiment of the present invention utilizing several commercially available components. A batching system of the type which is commercially available from Howe Richardson Company mixes in a mixing vessel ingredients from sources of sucrose 32, hot water 34 and lactose 36 to prepare the confectionary solution in a mixing vessel 38.

The prepared confectionary solution is then passed through a dissolver 40 of the kind which is commercially available from Baker Perkins Company to a holding tank 42. From the holding tank, the solution is pumped by a suitable pump 44 to a microfilm evaporator 46, also commercially available from Baker Perkins Company, wherein the moisture content of the solution is reduced. The evaporation may be conducted at atmospheric pressure, or preferably under a vacuum up to 15 inches of mercury.

The confectionary solution is then passed to a suitable holding tank 47, from which it is pumped by a high pressure pump 48 to a pressurizing vessel 49. The pressurizing vessel may be a commercially available continuous carbonator system, in which the confectionary solution is subjected to a superatmospheric pressure of carbon dioxide from a source 50 for several minutes to cause the absorption therein of a given quantity of carbon dioxide. The carbonator includes a heat exchanger 52 such that the temperature of the carbonated solution may be adjusted either higher or lower.

The solution is then transferred to a homogenizer 54 such as a Manton Gaulin two stage homogenizer which mechanically shears the gas bubbles further to reduce the average bubble size. The solution is then passed to a confectionary depositing unit 56, such as the kind produced by Baker-Perkins Company which includes a conveyor belt 58 having a plurality of suitably shaped mold cavities formed in its surface. The conveyor belt is operated within a pressurized vessel 58, pressurized from a $CO_2$ source 60. The pressurized vessel has an internal pressure which is substantially the same as that in the carbonator 49. The conveyor belt is an endless type of belt which is wrapped around end conveyor rollers 62. The molds in the conveyor belt are transported in a generally horizontal direction beneath a nozzle or nozzles 64 which dispense a metered predetermined quantity of the confectionary solution into each mold cavity. The travel speed of the belt is selected such that by the time the filled mold reaches the end of its horizontal travel, the solution in the cavity has solidified. The belt is cooled by cooling water 66, which circulates adjacent to the belt, to expedite solidification of the candy. The belt then travels to an inverted position in which the confectionary products are emptied from the molds onto a chute 68 which directs the products to a suitable collection area. A pressure lock 70 is provided to periodically enable collection of the resultant confectionary products.

The resultant product should be stored at relatively cool temperatures as storage temperatures above 90° F. could result in ballooning of the resultant products.

The discrete pieces of carbonated candy produced in a manner as described above can serve as the finished product, and accordingly may pass from the molding equipment directly to packaging. Optionally, final coatings of a variety of types may be applied to the carbonated candy. These coatings improve the storage stability of the product and also improve the mechanical stability and appearance thereof. For example, a hard coat of edible shellac or varnish, colored if desired, can be applied to the confection. In another embodiment a shiny, hard sugared coating may be applied by a procedure known in the confectionary industry as "pan coating" where the coating is applied and polished. In another embodiment a dry coating of sugar may be applied by a coating machine known as a "dry coater". Again, a polished coating of edible beeswax or carnauba wax may be applied by procedures well known in the confectionary art.

The carbonated candy of this invention may be packaged by wrapping the individual pieces and combining a number of these wrapped pieces in an outer wrapping or alternately, a number of the individual pieces may be stacked and wrapped together in a package. Any of the packaging procedures well known in the confectionary art may be employed to produce the carbonated candy of this invention in packaged form.

Although several embodiments of the present invention have been described in detail herein, it will be apparent to one of ordinary skill in the confectionary arts that many modifications of different embodiments may be constructed in accordance with the teachings of the present invention.

What is claimed is:

1. Apparatus for the preparation of regularly shaped pieces of gasified hard candy which gives a prolonged sizzling feeling in the mouth by pressurized deposit molding, comprising:
    (a) means for preparing a heated confectionary solution;
    (b) pressurizing vessel and mixing means for subjecting the prepared confectionary solution to a superatmospheric gas pressure for a sufficient length of time to cause absorption of an amount of gas into the solution;
    (c) a plurality of individual surface mold cavities linked together for common transport;
    (d) means for conveying said plurality of mold cavities;
    (e) means for depositing the pressurized confectionary solution containing absorbed gas into the plurality of moving mold cavities to form regularly shaped pieces;
    (f) a pressurizing housing surrounding said moving mold cavities, including means to remove the regular shaped pieces from the pressurized housing to atmospheric pressure.

2. Apparatus for the preparation of gasified candy by pressurized deposit molding as claimed in claim 1, including a second pressurized mixer for thoroughly mixing the gasified solution to further mechanically shear and subdivide gas bubbles therein prior to deposit of the solution in the mold cavities.

3. Apparatus for the preparation of gasified candy by pressurized deposit molding as claimed in claim 2, said mixer being a two stage homogenizer mixer.

4. Apparatus for the preparation of gasified candy by pressurized deposit molding as claimed in claim 1, said preparing means including means for preparing a hot sugar solution.

5. Apparatus for the preparation of gasified candy by pressurized deposit molding as claimed in claim 1, said pressurizing vessel means including pressure means for subjecting the confectionary solution to a superatmospheric pressure in the range from 50–500 psig.

6. Apparatus for the preparation of gasified candy by pressurized deposit molding as claimed in claim 1, said pressurizing vessel means including mixing means for incorporating 0.25–5.00 cc carbon dioxide per gram of candy into the confectionary solution at a superatmospheric pressure of 50–500 psig carbon dioxide.

7. Apparatus for the preparation of gasified candy by pressurized deposit molding as claimed in claim 1, said preparing means including means for preparing a confectionary solution having a temperature in the range from 280° to 320° F.

8. Apparatus for the preparation of gasified candy by pressurized deposit molding as claimed in claim 1, said plurality of cavities including a cooling means for cooling the confectionary solution after deposit in the mold.

9. Apparatus for the preparation of gasified candy by pressurized deposit molding as claimed in claim 1, said pressurizing vessel means including a mixer for stirring the confectionary solution being pressurized therein.

10. A method for preparing regularly shaped pieces of gasified hard candy which gives a prolonged sizzling feeling in the mouth by pressurized deposit molding, comprising:
  (a) preparing a heated confectionary solution;
  (b) mixing the confectionary solution in a pressurized vessel under superatmospheric gas pressure for a sufficient length of time to cause absorption of an amount of gas into the solution;
  (c) pressurizing a plurality of deposit molds at a superatmospheric pressure; and
  (d) depositing the pressurized gasified confectionary solution into said plurality of superatmospherically pressurized deposit molds.

11. The method of claim 10 in which the deposited confectionary solution is cooled and solidified.

12. The method of claim 10 wherein the confectionary solution is mixed at 200 to 1500 RPM while it is gasified in the pressurizing vessel.

13. The method of claim 11 in which solidified confectionary is emptied from the mold and passed through a pressurelock to recover the product.

14. The method of claim 11 in which the confectionary solution is mixed at superatmospheric pressure in the range from 50–500 psig.

15. The method of claim 14 wherein the superatmospheric pressure is pressurized carbon dioxide.

16. The method of claim 10 wherein the confectionary solution is prepared at a temperature range of 280° to 320° F.

17. The method of claim 10 wherein the resulting product consists of regularly shaped pieces of gasified candy which contains 0.25–5.0 cc of gas per gram of candy, said gas being evenly distributed therein as bubbles having an average diameter in the range of 10–60 microns.

* * * * *